United States Patent
Helal

(10) Patent No.: US 10,108,926 B2
(45) Date of Patent: Oct. 23, 2018

(54) ADAPTIVE ANALYTICS SYSTEM AND METHOD OF USING SAME

(75) Inventor: Robert Helal, Orleans (CA)

(73) Assignee: International Business Machines Corporation, Armonk, NY (US)

( * ) Notice: Subject to any disclaimer, the term of this patent is extended or adjusted under 35 U.S.C. 154(b) by 2206 days.

(21) Appl. No.: 11/732,568

(22) Filed: Apr. 4, 2007

(65) Prior Publication Data

US 2008/0249815 A1  Oct. 9, 2008

(30) Foreign Application Priority Data

May 11, 2006  (CA) .................................... 2546520

(51) Int. Cl.
G06Q 10/00 (2012.01)
G06Q 10/10 (2012.01)
G06Q 10/06 (2012.01)
G06Q 30/02 (2012.01)

(52) U.S. Cl.
CPC ......... *G06Q 10/10* (2013.01); *G06Q 10/0639* (2013.01); *G06Q 10/06311* (2013.01); *G06Q 10/06375* (2013.01); *G06Q 10/06398* (2013.01); *G06Q 30/0206* (2013.01)

(58) Field of Classification Search
None
See application file for complete search history.

(56) References Cited

U.S. PATENT DOCUMENTS

| 6,078,924 A * | 6/2000 | Ainsbury et al. |
| 6,684,191 B1 * | 1/2004 | Barnard et al. ............. 705/7.22 |
| 7,272,660 B1 * | 9/2007 | Powers et al. ................ 709/238 |
| 7,319,971 B2 * | 1/2008 | Abrahams et al. ............... 705/7 |
| 2002/0133368 A1 * | 9/2002 | Strutt et al. ......................... 705/1 |
| 2003/0033192 A1 * | 2/2003 | Zyman et al. .................. 705/10 |
| 2003/0139956 A1 * | 7/2003 | Guenther et al. ................ 705/7 |
| 2004/0230471 A1 * | 11/2004 | Putnam Brookes ........... 705/10 |
| 2005/0144114 A1 * | 6/2005 | Ruggieri et al. ................ 705/37 |

OTHER PUBLICATIONS

Chuck Ballard, Dirk Herreman, Don Schau, Rhonda Bell, Eunsaeng Kim, and Ann Valencic. Data Modeling Techniques for Data Warehousing. International Technical Support Organization, Feb. 1998.*

* cited by examiner

Primary Examiner — Stephanie Z Delich
(74) Attorney, Agent, or Firm — Patterson + Sheridan, LLP

(57) ABSTRACT

An adaptive analytics system comprises a set of analytic type templates representing analytic types, each analytic type template including predetermined report items for generating a report for a respective analysis type; and an analytic framework for defining relations among the analytic types. The relations provides analytic paths for navigating reports.

22 Claims, 18 Drawing Sheets

Sales Order Detail

| | | | | |
|---|---|---|---|---|
| For the Period From: Apr. 5, 2000 | To: Apr. 6, 2006 | Organization: All | Sales Representative: All | Sales Status: All |
| Customer: A1 | Material: All | Sales Document Type: Standard Order | Document Number: All | Group Currency Code: USD |

Sold to Customer Contact Information | Sales Contact Information

| Customer Number: | 1000 | | Sales Representative Name: | Taylor, Walter |
|---|---|---|---|---|
| Customer Name: | Precision Products | | Personnel Number: | 47 |
| Street Address: | 3392 L Street | | Sales Organization Name: | Sales West |
| City: | San Jose | | Plant Name: | Northwest Man. |
| Country: | United States | | Sales Order Summary | |
| Telephone Number: | (408)154-8987 | | Sales Order Amount: | 34,384.00 |
| Document Number: | 50000 | | Sales Order Discount: | 0.00 |
| Order Date: | Jan. 21, 2004 | | Sales Order Cash Discounted Amount: | 34,384.00 |
| Sales Document Type: | Standard Order | | Sales Order Cost: | 34,981.31 |
| Customer Purchase Order Number: | ' | | Sales Order Profits: | 1.50 |
| | | | Sales Order Profit Margin: | 0.0041% |

Sales Order Line Item Detail

| Document Item Number | Material Catalog GroupName | Material Description | Sales Order Quantity | UOH | Sales Order Discount | Sales Order CashDiscount | Sales Order GrossPrice |
|---|---|---|---|---|---|---|---|
| 1 | Consumer Electronics | Sonic DTC DigitalAdvance | 6 | Each | 0.00 | 0.00 | 54,304.00 |
| 2 | Home Theatre | Tidal Vision 5600 | 10 | Each | 0.00 | 0.00 | 29,900.00 |

Report Run Date: April 8, 2006

Page 1

Figure 5

Detailed Employee List

As of Date: Nov. 11, 2005  
Department: All  
Job Family: All  
Employee Status: All .00

| Department Name | Name | Employee ID | Job Family Name | Position Name | Manager Name | Salary Grade | Reg./Temp | Person Type | Personal Status | Annual Rate | Length Service |
|---|---|---|---|---|---|---|---|---|---|---|---|
| Administration | Campos, Juliette Leigh | KUZ014 | Admin.Support | | Richards,CA | | Regular | , | Employee | 20,800 | 11.1 |
| | Chae,Kevin | KU0106 | | Time&Labor Specialist | | | Regular | , | Employee | 5,200 | 1.0 |
| | Cook, Patrick Keith | KUZ015 | Admin.Support | | Richards, CA | | Regular | , | Employee | 32,000 | 10.7 |
| | DiBenedetto, Rhonda | KUI007 | | | Erickson, Arthuro | | Regular | , | Employee | 22,880 | 15.1 |
| | Richards,Catherine Ann | KUZ013 | | | Lee, Jeannette | | Regular | , | Employee | 110,000 | 11.4 |
| | Valowski, Katrina Anna | KUZ016 | | | Richards, CA | | Regular | , | Employee | 20,800 | 9.3 |
| Administrative Department | BOURREAU, Jacques | KF0026 | | | Giraud,Phillipe | | Regular | , | Employee | 27,600 | 3.2 |
| | Desmarrets, Jean | KF0007 | | | Giraud,Phillipe | | Regular | , | Employee | 42,258 | 16.0 |
| | Giraud, Philippe | KF0011 | | | Berger, Maurice | Acting Executive | Regular | , | Employee | 112,909 | 21.4 |
| | Grand,Stephane | KF0012 | | | Girard, Phillipe | | Regular | , | Employee | 29,550 | 18.4 |
| | Jerek, Nicole | KF0006 | | | Giraud, Phillipe | | Regular | , | Employee | 18,110 | 17.2 |
| Benefits | Bidar, Sanjay A | KUZ011 | | | | | Regular | , | Employee | 38,000 | 10.8 |
| | Brockton, Tyler | KCL050 | | | | | Regular | , | Employee | 864,000 | 3.1 |
| | Fong, Brevin | KUL052 | | | | | Regular | , | Employee | 60,000 | 3.1 |
| | Lemoreaux,Nathalie E | KUZ010 | | | | | Regular | , | Employee | 35,000 | 11.2 |
| | Millier, Joseph G | KC0030 | | | St Amand,Marcel | | Regular | , | Employee | 19,500 | 8.4 |
| Business Services | Howe, Anthony R | KC0010 | | | StAmand,Marcel | | Regular | , | Employee | 55,000 | 8.2 |
| | Koberg, Charles | KUI005 | | | Aliverdi, Reza | | Regular | , | Employee | 21,840 | 10.4 |
| Cafeteria/Rest.Dept | Givens, Samuel | KUD008 | | | Yoder, Michael | | Regular | , | Employee | 20,800 | 6.9 |
| Corporate Headquarters | Chandler, Kody | KUI016 | | | Aliverdl, Reza | | Regular | , | Employee | 20,800 | 15.6 |
| | Koberg, Charles | KUI006 | | | Aliverdl. Reza | | Regular | , | Employee | 20,800 | 15.6 |
| Customer Service | Benigo, Rosa | KU0082 | | | Santos, Antonio | | Regular | , | Employee | 60,009 | 16.9 |
| | Francisco, Brenton | KU0048 | | | Channing, Rosa | | Regular | , | Employee | 26,000 | 18.6 |
| | Lopez, Wilma | KU0057 | | | Palisco, Tina | | Regular | , | Employee | 60,000 | 9.5 |
| | Morgan, Richard | KU0037 | | | Johnson, Danny | | Regular | , | Employee | 25,000 | 20.0 |
| | Ng, Edward | KU0056 | | | Kessler, Marc | | Regular | , | Employee | 48,005 | 17.6 |
| | Osario, Dominick | KU0033 | | | Tyler, Sylena | | Regular | , | Employee | 60,005 | 21.3 |

Report Run Date: November 11, 2005          Page 1

Figure 6

Employee Review Summary

For the Period From: Jan 1 1997  
To: Nov 15 2005  
Department: All  
Job Family: All

| Name | Emp ID | Position Name | Job Entry Date | Review Type Name | Review Status Name | Employee Review Effective Date | Review Rating | Review Score Name | Rating Model Name |
|---|---|---|---|---|---|---|---|---|---|
| Aman, Isabella M | K00002 | - | Nov 1, 1985 | Salary | Proposed | Apr 1, 2000 | | | German Rating Model |
| Barrington, Ellen | L00013 | Admin Officer | Dec 1, 1995 | Official Rating | Proposed | Dec 1, 2000 | 3 | 1-Hervorragend | German Rating Model |
| Bruce, Frederick | K00004 | - | Jan 1, 1987 | Salary | | Apr 1, 2000 | 1 | 3-Gut | |
| Burd-Gannon Fern | K10001 | - | Oct 1, 1990 | Salary | Proposed | Apr 1, 2000 | 3 | | |
| Cabin, Daisy | K11002 | - | Apr 1, 1990 | Salary | Approval | Mar 31, 2000 | | | Performance Appraisal System |
| Diangelo, Dino | L00002 | ComputerSpec. | Oct 15, 1995 | Official Rating | Proposed | Jan 1, 1997 | 4 | | |
| Devries, Craig | K00021 | - | Mar 16, 1969 | Performance | | Jun 8, 2000 | 5 | Outstanding | |
| DiCarlo, Antoin | L00004 | N.S. Admin. | May 12, 1997 | Official Rating | Proposed | Oct 1, 1998 | 1 | | |
| Griffith, Martina | K00001 | - | Jan 1, 1990 | Salary | | Apr 1, 2000 | | | |
| Grey, Alex | K00003 | - | Jan 1, 1990 | Salary | Proposed | Apr 1, 2000 | 3 | | |
| Hazib, Edward | L00007 | Personal Assist | Jul 20, 1999 | Official Rating | Proposed | Jan 1, 1999 | 5 | | |
| Imari, Jim | K11005 | - | Apr 1, 1990 | Salary | Proposed | Mar 31, 2000 | | | |
| Kip, Harry | L00005 | Personal Assist | Jun 7, 1998 | Official Rating | Proposed | Oct 1, 1998 | 5 | | |
| O'Flaherty, Patrick | K00016 | - | Oct 1, 1990 | Salary | | Mar 30, 2000 | 4 | 4-Very Good | Comp Mgmt Scale |
| Rodriguez, Lucia | L00001 | Personal Assist | Feb 2, 1996 | Official Rating | Proposed | Oct 5, 1998 | 4 | | |
| Sajenac, Hiko | L00005 | Personal Assist | Dec 1, 1993 | Official Rating | Proposed | Oct 1, 1998 | 5 | | |

Figure 7

Receivables Organization Profile Summary Data

| Customer Number | Customer Name | Collection Manager Name | Receivables Invoice | Receivables Open Invoice Amount | Open Invoice Count | Receivables Invoice Past Due Count | Receivables Weighted Average Days Past Due | Receivables Weighted Average Days to Collect |
|---|---|---|---|---|---|---|---|---|
| 1000 | Precision Products | Frank Bretton | 205,718,382.34 | 9,883,332.21 | 51 | 49 | 0.00 | 97.52 |
| 1004 | Avantage.com | Jacqueline Miller | 145,325,068.50 | 1,793,421.29 | 66 | 21 | 0.00 | 95.37 |
| 1005 | Telco House | Joan Avery | 551,641.13 | 65,018.63 | 10 | 5 | 0.00 | 37.33 |
| 1007 | Communication Media | Georgia Judson | 112,459,673.47 | 1,320,174.68 | 37 | 16 | 0.00 | 69.15 |
| 1008 | BigBoss.com | Georgia Judson | 120,611,463.32 | 1,347,866.38 | 71 | 39 | 0.00 | 60.00 |
| 1045 | Columbia.com | Frank Bretton | 3,510,565.90 | 0.00 | 0 | 0 | 0.00 | 38.54 |
| 1143 | Electronic Way | Georgia Judson | 32,625,916.29 | 895,322.25 | 38 | 18 | 0.00 | 36.15 |
| 1147 | Grew Audio, Inc. | Jacqueline Miller | -52,298.20 | 0.00 | 0 | 0 | 0.00 | 133.00 |
| 1182 | Digital2Go Services | Joan Avery | 934,575.00 | 0.00 | 0 | 0 | 0.00 | 17.91 |
| 1207 | Digital2Go Project Mfg | Joan Avery | 444,013.15 | 0.00 | 0 | 0 | 0.00 | 28.17 |
| 1526 | Globe Dept Stores | Jacqueline Miller | 1,579,137.50 | 0.00 | 0 | 0 | 0.00 | 40.00 |
| 1608 | Dynamic Sounds | Jacqueline Miller | 3,635,560.14 | 1,920,355.75 | 85 | 29 | 0.00 | 38.99 |

Report Run Date: April 7, 2005　　Last Working Date: Feb 8, 2006　　Page 1

Figure 8

Customer Receivables Profile Detail

| Ar Aging Category | Invoice Number | Invoice Date | Payment Schedule Number | Invoice Schedule Due Date | Days Past Due | Payment Terms Description | Receivables Discount Deadline Date | Receivables Payment Schedule Amount | Receivables Receipt | Open Invoice Amount |
|---|---|---|---|---|---|---|---|---|---|---|
| Current Receivables | 10007787 | Feb 1, 2002 | 1 | Mar 3, 2002 | 0 | Due in 30 days. Payment terms can include a discount % for early payment and you can assign multiple discounts to each payment term line. | Mar 3, 2002 | 210,463.93 | 0.00 | 210,463.93 |
| | 10007865 | Feb 6, 2002 | 1 | Mar 8, 2002 | 0 | Due in 30 days. Payment terms can include a discount % for early payment and you can assign multiple discounts to each payment term line. | Mar 8, 2002 | 61,629.29 | 0.00 | 61,629.29 |
| | 10007908 | Feb 7, 2002 | 1 | Mar 9, 2002 | 0 | Due in 30 days. Payment terms can include a discount % for early payment and you can assign multiple discounts to each payment term line. | Mar 9, 2002 | 61,629.29 | 0.00 | 61,629.29 |
| | 10007947 | Feb 8, 2002 | 1 | Mar 10, 2002 | 0 | Due in 30 days. Payment terms can include a discount % for early payment and you can assign multiple discounts to each payment term line. | Mar 10, 2002 | 61,629.29 | 0.00 | 61,629.29 |
| | 10007992 | Feb 11, 2002 | 1 | Mar 13, 2002 | 0 | Due in 30 days. Payment terms can include a discount % for early payment and you can assign multiple discounts to each payment term line. | Mar 13, 2002 | 61,629.29 | 0.00 | 61,629.29 |
| | 10008047 | Feb 12, 2002 | 1 | Mar 14, 2002 | 0 | Due in 30 days. Payment terms can include a discount % for early payment and you can assign multiple discounts to each payment term line. | Mar 14, 2002 | 61,629.29 | 0.00 | 61,629.29 |
| | 10008083 | Feb 13, 2002 | 1 | Mar 15, 2002 | 0 | Due in 30 days. Payment terms can include a discount % for early payment and you can assign multiple discounts to each payment term line. | Mar 15, 2002 | 61,629.29 | 0.00 | 61,629.29 |
| | 10008171 | Feb 15, 2002 | 1 | Mar 17, 2002 | 0 | Due in 30 days. Payment terms can include a discount % for early payment and you can assign multiple discounts to each payment term line. | Mar 17, 2002 | 61,629.29 | 0.00 | 61,629.29 |

Figure 9B

| Customer Order Purchase Overview | | | | |
|---|---|---|---|---|
| Sales Order Amount | | | | |
| | 2000 | 2001 | 2002 | All Fiscal Posted Start Dates |
| By Customer Number | 0.00 | 0.00 | 481,944,699.55 | 550,848,183.81 |
| Avantage.com | 0.00 | 0.00 | 49,043,636.00 | 53,685,938.41 |
| BigBoss.com | 0.00 | 0.00 | 41,298,429.00 | 42,969,675.32 |
| Columbia.com | 0.00 | 0.00 | 0.00 | 2,230,502.50 |
| Communication Media | 0.00 | 0.00 | 41,927,954.00 | 45,906,757.78 |
| Digital2Go Corporation | 0.00 | 0.00 | 0.00 | 1,599.00 |
| Dynamic sounds | 0.00 | 0.00 | 0.00 | 4,061,203.97 |
| Electronic Way | 0.00 | 0.00 | 0.00 | 5,744,302.85 |
| Electronics Direct | 0.00 | 0.00 | 10,363,180.50 | 12,243,155.18 |
| Excitement Electronics | 0.00 | 0.00 | 0.00 | 1,506,674.49 |
| Grew Audio, Inc. | 0.00 | 0.00 | 0.00 | -47,980.00 |
| Hakui Rentals | 0.00 | 0.00 | 0.00 | 601.19 |
| Heroix Corporation | 0.00 | 0.00 | 10,139,526.60 | 12,466,200.12 |
| In House | 0.00 | 0.00 | 0.00 | 0.12 |
| Live Vault Corporation | 0.00 | 0.00 | 0.00 | 51.00 |
| Live Vault Corporation | 0.00 | 0.00 | 0.00 | 27,614.00 |

Figure 15

ADAPTIVE ANALYTICS SYSTEM AND METHOD OF USING SAME

FIELD OF THE INVENTION

The present invention relates to a system and method for managing business intelligence related information analysis, and more particularly, to an adaptive analytics system and method of using same.

BACKGROUND OF THE INVENTION

Many organizations have various databases storing information that relates to their business. The problem faced by organizations is the difficulty in effectively structuring and using information in management problem solving and decision-making. This problem can be attributed to several factors, such as, how information is presented to solve similar types of problems can differ within an organization, how the information is interpreted for similar types of problems is inconsistent or varies across decision-makers in the organization, the analytic skills vary across decision-makers in like roles within the organization, required information is unavailable or untimely, required information is unreliable, and required information is not delivered in a form that provides insight. As a result, there is lower than expected levels of adoption and return on investment. The invisible cost is the impact of slow or less informed decision-making on organizational results.

Some existing business intelligence tools attempt to address the business intelligence related information delivery problems through iterations of detailed report requirements gathering, report design, and authoring. This approach involves costly and time-consuming manual processes, which can be performed by skilled and knowledgeable system personnel only.

Some enterprise resource planning (ERP) systems provide selections of predefined reports. However, these predefined reports are often not used because they do not meet the specific business requirements of end users.

It is therefore desirable to provide a mechanism that can deliver business information which are useful in making informed decision, and support a consistent and reliable view for analysis of similar types of problems across the business.

SUMMARY OF THE INVENTION

It is an object of the invention to provide an improved system that obviates or mitigates at least one of the disadvantages of existing systems.

The invention uses an adaptive analytics system that allows users to manage analytic types and paths among the analytic types.

In accordance with an aspect of the present invention, there is provided an adaptive analytics system comprising a set of analytic type templates and an analytic framework. The set of analytic type templates represent analytic types. Each analytic type template includes predetermined report items for generating a report for a respective analysis type. The analytic framework is provided for defining relations among the analytic types, the relations providing analytic paths for navigating reports.

In accordance with another aspect of the invention, there is provided a method of creating an analytic framework for use in analysing information stored in a database system. The method comprises the steps of receiving a definition of a new role; receiving selection of one or more analytic type templates that are used by the new role for the information analysis; configuring the analytic type templates for the new role; and generating a new analytic framework based on the configured analytic type templates.

In accordance with another aspect of the invention, there is provided an analytic framework comprising a set of analytic type representations and a set of paths. Each of the analytic type representations represents an analytic type template including predetermined report items for generating a report for a respective analysis type. The set of paths connects the analytic type templates for defining relations among the analytic types.

In accordance with another aspect of the invention, there is provided a computer readable medium storing instructions and/or statements for use in the execution in a computer of a method of creating an analytic framework for use in analysing information stored in a database system. The method comprises the steps of receiving a definition of a new role; receiving selection of one or more analytic type templates that are used by the new role for the information analysis; configuring the analytic type templates for the new role; and generating a new analytic framework based on the configured analytic type templates.

In accordance with another aspect of the invention, there is provided a propagated signal carrier containing computer executable instructions and/or statements that can be read and executed by a computer, the computer executable instructions being used to execute a method of creating an analytic framework for use in analysing information stored in a database system. The method comprises the steps of receiving a definition of a new role; receiving selection of one or more analytic type templates that are used by the new role for the information analysis; configuring the analytic type templates for the new role; and generating a new analytic framework based on the configured analytic type templates.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 5 is a diagram showing an example of an analytic type;

FIG. 6 is a diagram showing another example of an analytic type;

FIG. 7 is a diagram showing another example of an analytic type;

FIG. 8 is a diagram showing another example of an analytic type;

FIG. 9, which comprises FIGS. 9A and 9B, is a diagram showing another example of an analytic type;

FIG. 15 is a diagram showing another example of an analytic type;

DETAILED DESCRIPTION OF PREFERRED EMBODIMENTS

Figure 1:
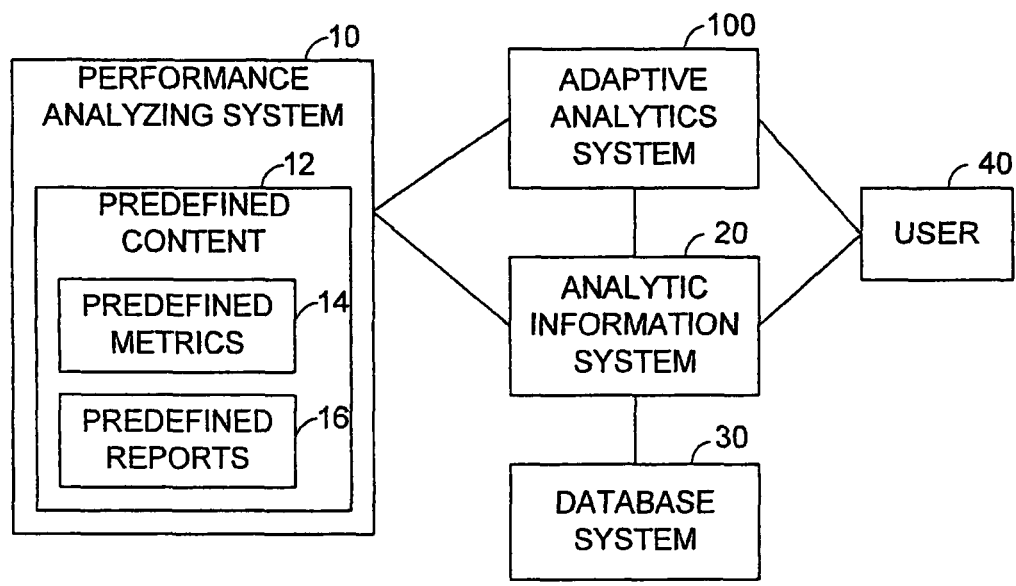
FIG. 1 is a block diagram showing an adaptive analytics system in accordance with an embodiment of the present invention.

FIG. 1 shows an adaptive analytics system 100 in accordance with an embodiment of the invention. The adaptive analytics system 100 is used with or within a performance analyzing system 10. While FIG. 1 shows the adaptive analytics system 100 separate from the performance analyzing system 10, the adaptive analytics system 100 may include all or part of the performance analyzing system 10.

The performance analyzing system 10 is typically a packaged software application that provides users with functionality to build one or more analytic information systems 20 suitable for user's organization. Users use the analytic information systems 20 to analyze business intelligence related information in one or more database systems 30 of the organization.

The performance analyzing system 10 includes predefined content 12. The predefined content 12 provides a set of content definitions based on roles of people that typically exist in various organizations. Roles may include, for example, a sales manager, an account receivable manager, and human resource personnel. The predefined content 12 includes predefined metrics 14 and predefined reports 16. The predefined metrics 14 are measurements based on which information in database systems 30 is analyzed. The predefined reports 16 are used to generate actual reports that can be used to analyze the performance in the business.

The adaptive analytics system 100 provides analytic types and an analytic framework that are used as component that will become part of the analytic information system 20 as actual reports and drill paths. The predefined content 12 provided by the performance analyzing system 10 is often not directly applicable to the needs of a specific organization. Users often need to modify the predefined content or create new content suitable to the specific organization. The adaptive analytics system 100 provides a platform based on which the user can modify the form of the predefined content or create new content for building its own analytic information system 20 for the specific organization, as described further below. Since the adaptive analytics system 100 provides reports and drill paths as part of the analytic information system 20 which is suitably built for the specific organization, users of the organization can obtain a consistent and reliable view of the business for analysis of similar types of problem is across the business. The result is more effective decision-making throughout the business and increased adoption of the system in support of decision-making processes.

Figure 2:
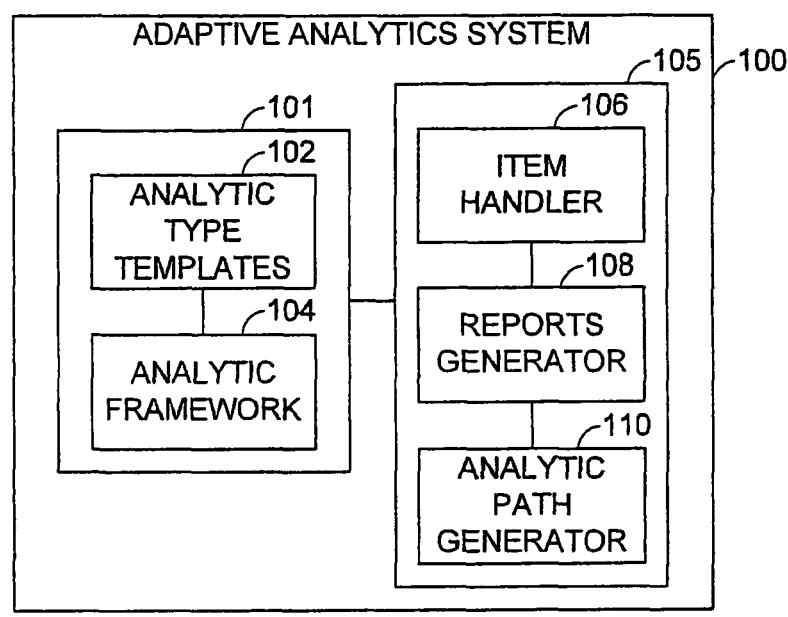
FIG. 2 is a block diagram showing an embodiment of the adaptive analytics system.

Referring to FIG. 2, the adaptive analytics system 100 is further described. The adaptive analytics system 100 contains an analytic type templates 102 and analytic framework 104.

The analytic type templates 102 are a set of predefined templates representing analytic types. Each analytic type template 102 describes an analytic type as a layout of information in the form of a report. The report is an advanced report, compared to standard predefined reports in existing typical ERP systems. The report is aimed at providing insight into a particular type of business problem, e.g. trend analysis and contribution analysis. The analytic type templates 102 support the rapid development and delivery of role based content to an organization's business community.

Each analytic type represents a common analysis theme (e.g., trending, variance, detailed transaction), and can be used to support similar "thematic" reporting needs across different organizational contexts. An analytic theme may be a collection or family of similar analytic types. For example, a variance analysis analytic type can be used to deliver variance to budget at the organization level or at the cost centre manager level. The same variance analytic type can be used to deliver an analysis of variance of actual to planned headcount.

The analytic types are defined based on typical information needs in various organizations. Thus, the analytic types represented by the templates 102 can be used across types of business problems, and can be viewed as a best practice approach to analyzing a type of problem. For example, a trend analytic type can be used to create analysis of similar types of problems, such as sales revenue trend, customer turnover trend, and bad debt trend. Other examples of analytic types may include a transaction detail analytic type, transaction list analytic type, detailed summary analytic type, profile analytic type, cycle time aging analytic type, contribution analytic type, cross-tab contribution analytic type, variance analytic type, and other combination analytic type. These analytic types are further described below referring to FIGS. 4-17.

An analytic type template 102 provides a distinct layout that prescribes how dimensions are defined as assembled, as well as how measures are included and considered. For example, the distinct layout may prescribe how primary, secondary and tertiary dimensions are defined as assembled. In a different analytic type template 102, more or fewer relevant dimensions may be involved. An analytic type template 102 also provides a prescribed layout of information that supports the type of analysis of interest. The analytic type template 102 is typically a combination of consistent graphical representations of information supported by table data.

The individual analytic types fit into the analytic framework 104, which defines paths from higher level summary level analysis to more detailed insight, passing context along the paths.

The analytic framework 104 provides a logical mapping of one analytic type to another analytic type, defining an analysis path from a more summarized/aggregated view of a problem to a more detailed view of the drives of the observed phenomena. The analytic framework 104 supports guided analysis of the business intelligence related information.

For example, an analysis may begin with a problem statement "Which customers are contributing most to revenue?". This is answered by building an analysis based on the contribution analytic type. The next question may be "What has been the activity with our third largest customer?" This suggests use of a new analytic type to answer this type of questions, i.e., a profile analytic type, and a link or guided analysis from the contribution analytic type to a profile analytic type.

Figure 3:
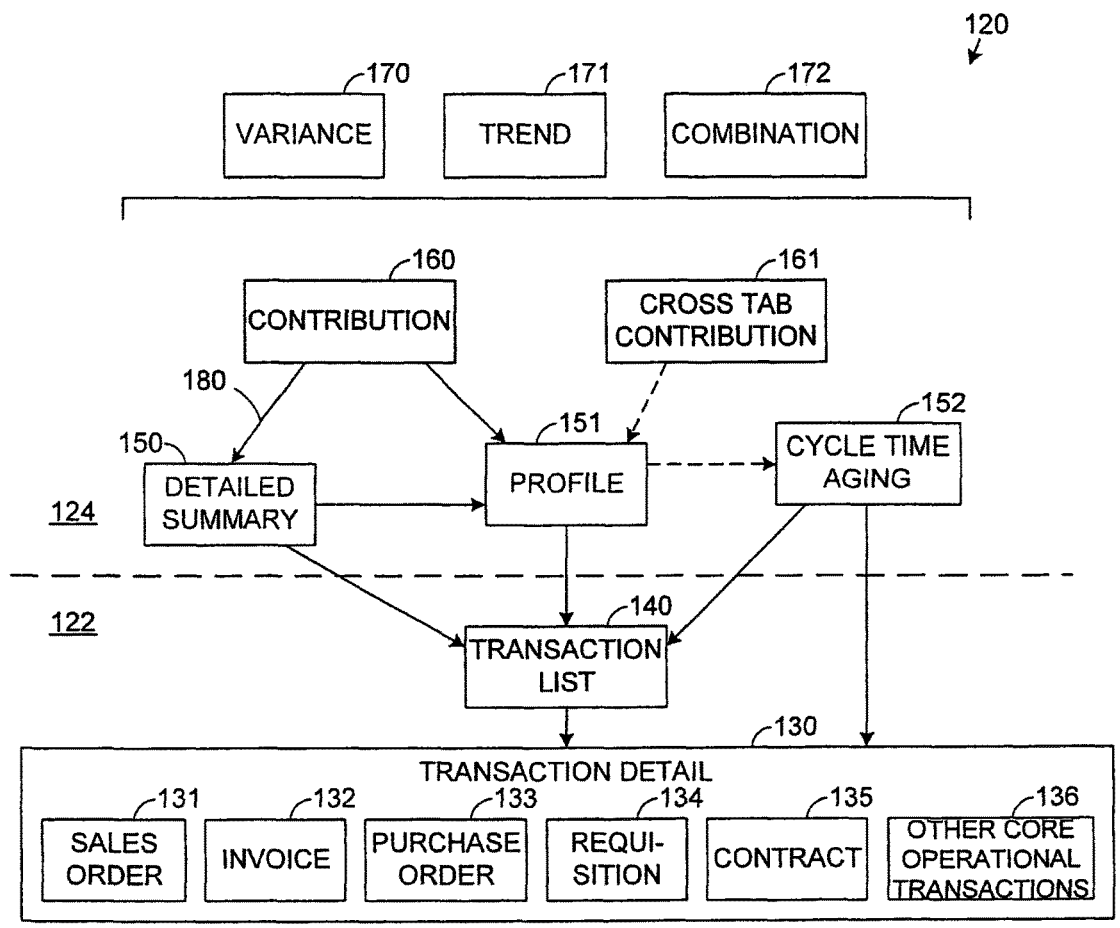
FIG. 3 is a diagram showing an example of an analytic framework.

FIG. 3 illustrates an embodiment 120 of the analytic framework 10. The analytic framework 120 contains operational analysis types 122 and analytic analysis types 124. The operational analysis types 122 include a transaction detail analytic type 130 and transaction list analytic type 140. The analytic analysis types 124 include detailed summary analytic type 150, profile analytic type 151, cycle time aging analytic type 152, contribution analytic type 160, cross-tab contribution analytic type 162, variance analytic type 170, trend analytic type 171, and other combination analytic type 172. These analytic types are linked by arrows 180, which represent the analytic paths or flows from summary level analysis to detail analysis to the individual transaction type. A different embodiment of the adaptive analytics system 100 may have more or fewer analytic types or different analytic types. Also, an analytic framework 120 and the number of analytic types used in an analytic framework 120 may be refined and/or expand over time.

The analytic framework 104 provides analytic report structures (or "storyboards") that represent types of analysis that are used in management decision-making processes. Thus, the analytic framework 104 supports various types of decision analysis. The analytic framework 104 accelerates time to deliver—business intelligence related information to users, and bring consistency to analysis of similar problem types. The applicability of the analytic framework 104 can span functions in a business and across industries, and evolve over time. The analytic framework 104 is used in defining role based information (report) packages aimed at addressing business specific insight, as well as link and guide analysis.

The adaptive analytics system 100 has a store 101 for storing the analytic type templates 102 and analytic framework 104.

As shown in FIG. 2, the adaptive analytics system 100 may further include an item handler 106, reports generator 108 and analytic path generator 110.

The item handler 106 allows users to manipulate items in a selected analytic type template, or create a template for a new analytic type. For example, users may modify dimensions or measures assigned to an existing role, modify the layout of a selected analytic type, or create new content for a new role.

The reports generator 108 generates one or more new reports based on configuration of an existing templates. The analytic path generator 110 generates analytic paths among the new reports based on the analytic framework 104. The new reports and new analytic paths form a modified organization specific analytic framework 104, which becomes part of the analytic information system 20 for actual report generation and information navigation.

Figure 4:
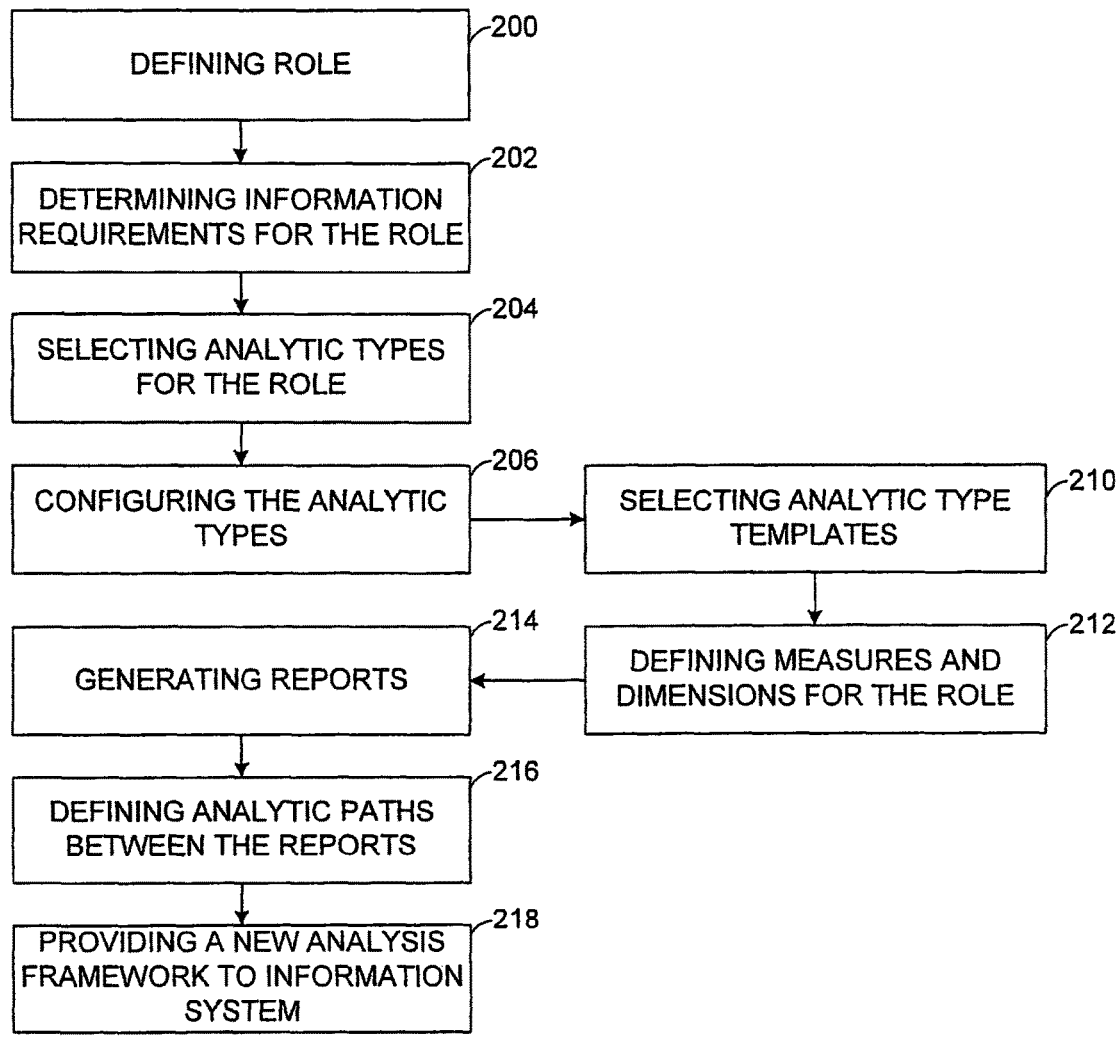
FIG. 4 is a flowchart showing a method of creating new content.

FIG. 4 shows an example of the process of creating new content using the adaptive analytics system 100. The user defines a role (200) and determines information requirements that the role typically needs (202). Within the adaptive analytics system 100, the user selects one or more analytic types that the role needs for the analysis (204), and configures the analytic types (206). To configure the analytic types, the user takes an analytic type template representing the selected analytic type (210), and defines the measures and dimensions that are needed for the role (212). Based on the configuration of the analytic types, the adaptive analytics system 100 generates a series of reports using the template for people within the role (214). It also generates analytic paths by linking the series of reports based on the analytic framework 104 (216). The series of reports and the analytic paths form a modified analytic framework which is provided to the analytic information system 20 (218). When the user analyzes information for the role using the analytic information system 20, the analytic paths in the modified analytic framework support drill through from summary to detail reports.

By providing analytic paths, the adaptive analytics system 100 reduces time to obtain desired information: It provides a best practice analysis framework that organizations can adopt to accelerate the creation of reporting and analysis for the organizations decision-makers, which reduces the time invested in information needs definition for content development.

Also, the adaptive analytics system 100 provides a consistent approach to representing business information for specific types of problems. This improves organizational learning in the use of reporting and analysis in decision-making processes, which reduces the cost of training, introduces consistency in the use of information, and supports increased adoption in the use of BI to support decision-making processes.

Through the item handler 106, reports generator 108 and analytic path generator 110 of the adaptive analytics system 100, unlike pre-defined reports or custom-made BI reports, it is easy to adapt the adaptive analytics system 100 to changing information needs. Unlike traditional BI tools, implementation and customization of the adaptive analytics system 100 does not require a specialist report author.

The following provide further descriptions of the analytic types which are reflected in an embodiment of the adaptive analytics system 100 and shown in FIG. 3.

The transaction detail analytic type 130 serves the need for the insight into detail at the individual transaction level. At the individual transaction level, there may be, for example, sales order detail analytic type 131, receivable invoice analytic type 132, purchase order analytic type 133, requisition analytic type 134, contract analytic type 135, and other core operational transactions 136.

Each analytic type template representing the transaction detail analytic type 130 contains a time prompt option and multiple prompts that allow for the generated report to filter on a specific transaction. This allows users to be able to look at the details, e.g., header and line item, surrounding a specific event/action that occurred in a business process area.

FIG. 5 shows an example of a report generated by the sales order analytic type 131. The template 102 for this analytic type 131 defines the headings of each item in the report and the layout of the items and tables.

The transaction list analytic type 140 serves the requirement or condition to deliver insight into a listing of transaction of a particular type, meeting specific criteria (e.g. open sales orders, past due invoices, or employee performance review). The transaction list analytic type 140 allows for the inclusion transaction specific details (e.g., order number, employee name, product number), and the amounts associated with the transaction that are of interest to the business (e.g., sales order extended amount, total discounts, net sales order amount).

FIGS. 6 and 7 show examples of a report generated by the transaction list analytic type 140. FIG. 6 shows a detailed employee list, and FIG. 7 shows an employee review summary.

The detail summary analytic type 150 provides a comparative listing of information of interest at the summary level, based on criteria defined for the business user. Examples of the detail summary analytic type 150 include listing of total purchases orders and contract amount for a product across all suppliers of the product over the past quarter, and listing of total employee turnover, and summarized In and Out totals by department in the past year.

The template for the detail summary analytic type 150 is similar to the transaction list analytic type 140 in layout and in that it provides a comparative listing, as exemplified in FIG. 8. The detail summary analytic type 150 provides a summarized level of detailed information, i.e. summarized low-level transactions. It provides analysis of summarized information by various prompts and allows for drill through down to low-level transactions.

The detail summary analytic type 150 allows for the inclusion context specific details (e.g., vendor name/number, employee name/number, organization number and manager), and the amounts of interest to the business (e.g., total sales and returns for the period across products, total purchases and commitment across vendors).

The profile analytic type 151 provides a broad picture of relevant activity as it relates to an individual entity (e.g., customer, product, employee, vendor), providing a 360 degree view. For example, an employee profile report may present employee pay and benefits to date, current profile (position, department, manager), most recent performance ratings and skills profile. Another example is that a customer profile report may include customer contact information, sales representative, total sales to date, current receivables position including past due balances and a summary of product purchase activity.

The profile analytic type 151 supports the construction of analysis that provides the desired 360 degree view that is relevant for the entity of interest (e.g. individual organization, customer, product, and employee).

Figure 9A:
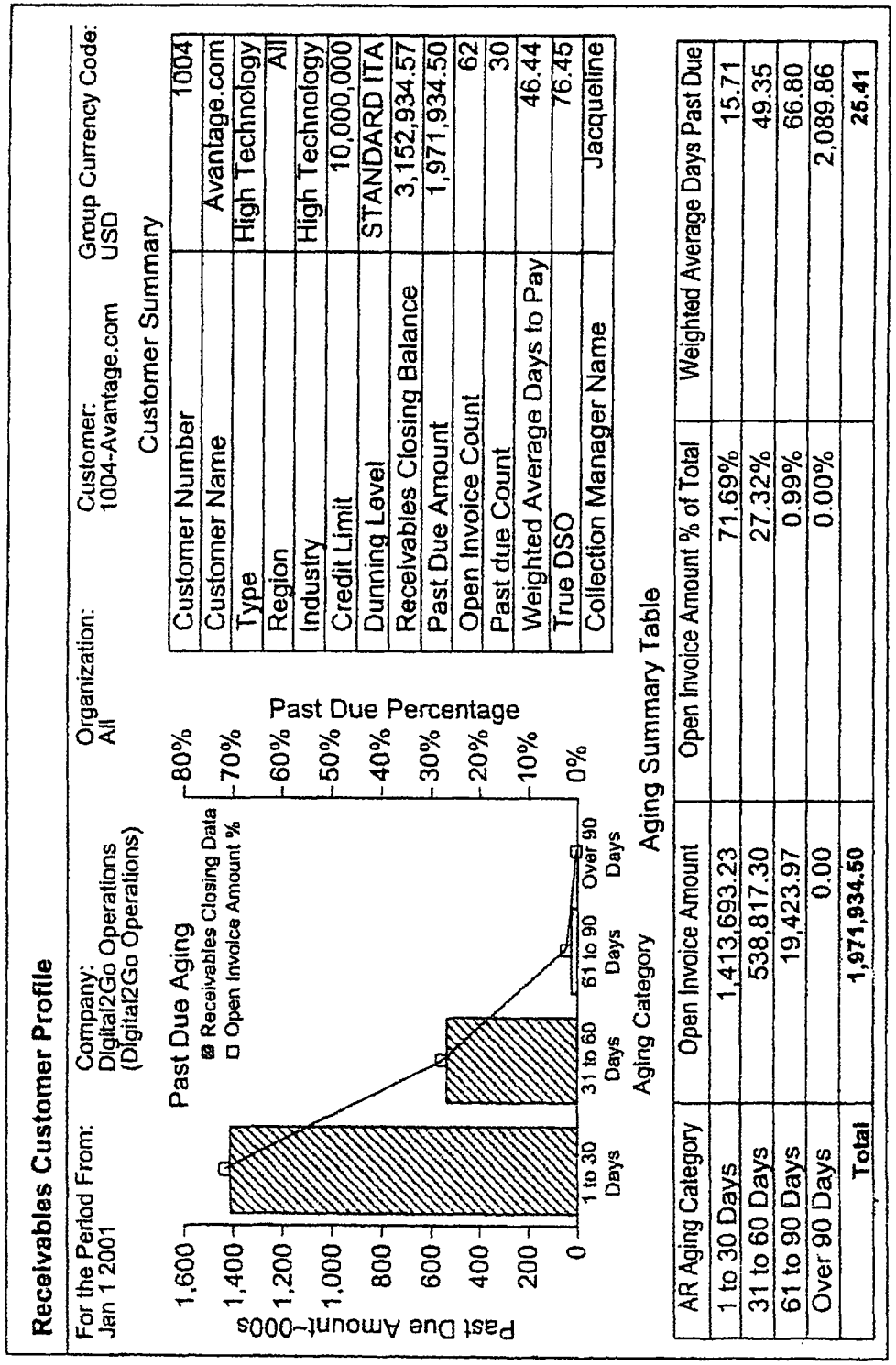

FIG. 9 (shown as FIGS. 9A and 9B) is an example of a profile report focused on customer and accounts receivable.

The cycle time analytic type 152 provides an overview of two types of analysis that are similar in nature: cycle time and aging. The aging analytic type provides an overview of the progress of multiple ongoing (open) activities relative to their deadlines at a point in time. The cycle time analytic type provides an overview of the duration of multiple completed (closed) activities. Both analytic types allow users to report the information within a predefined number of time buckets or other categories.

A sample analytic report that is supported by the cycle time analytic type 152 includes an accounts receivable aging schedule, an analysis of employee turnover times (e.g., 0-3 months, 3 m-1 year, 1-3 years, 3-5 years, 5-10 years, >10 years), and production work order late delivery times.

Figure 10:
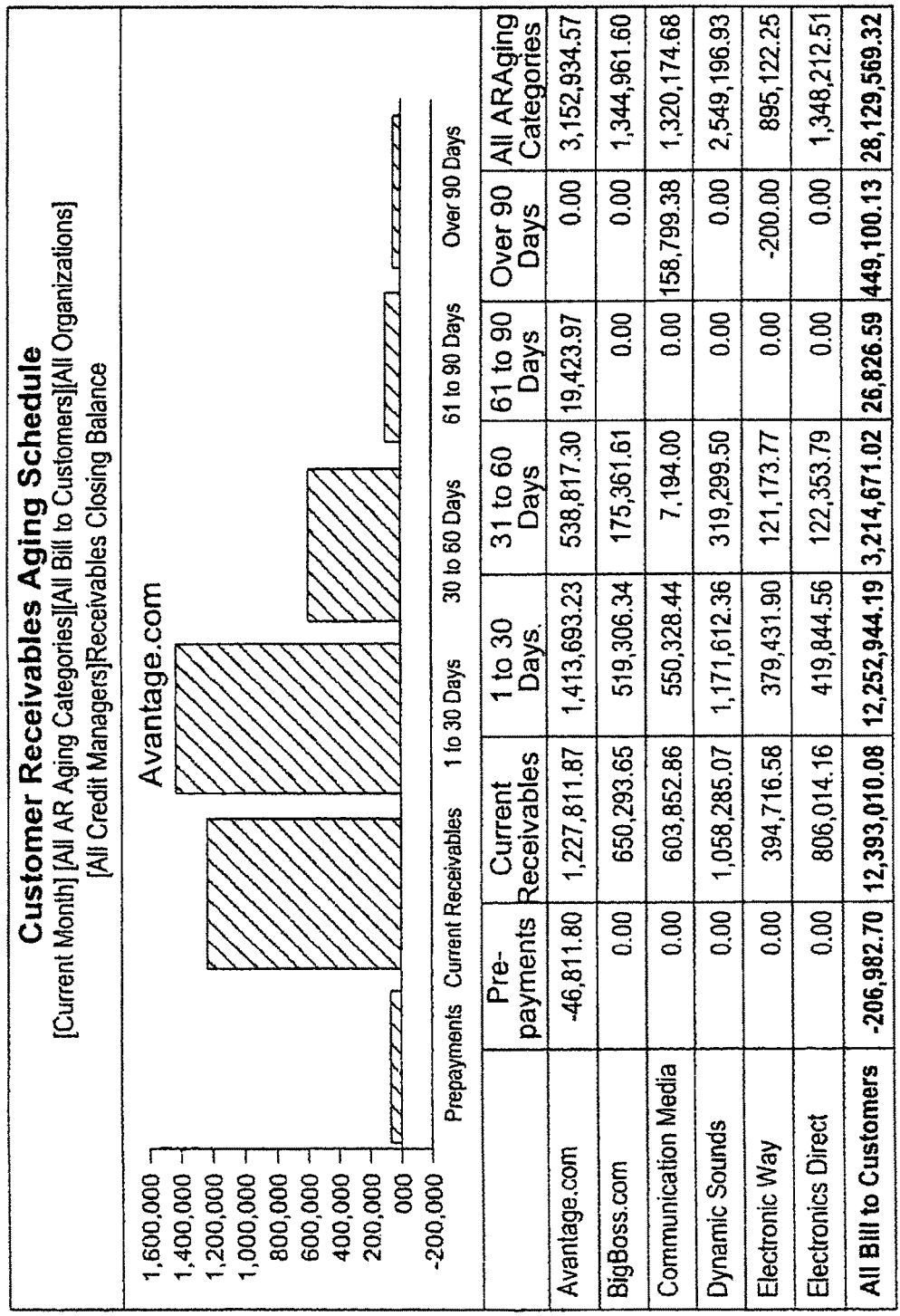
FIG. 10 is a diagram showing another example of an analytic type.

FIG. 10 shows an example of a report showing a customer receivables aging schedule.

The variance analytic type 170 is one of the top or fundamental level analytic types. At the fundamental level, when a user looks at variances, the user is typically trying to establish the difference between what has actually happened and what was expected to have happened, namely the original budget.

The variance analytic type 170 extends into other types 130-161 of analyses by leveraging off the fundamental building blocks of a typical variance report, i.e., a value type variance analysis report. As a result, using the same constructs, the variance analytic type 170 is also able to perform relative time variance analysis (e.g., this year's measure versus last year's measure) as well as combining both value type and relative time variance analysis.

Regardless of the type of variance, each template of the variance analytic type 170 highlights the biggest impacts in absolute terms (e.g. overall variance (in units) by contributor), as well as in relative terms (e.g., the percentage of change in variance), which sometimes shows how contributors have performed as a percentage of expected performance.

The variance analytic type 170 supports (1) value type variance (actual versus budget) (2) relative time variance (current period over previous period (e.g., year, quarter, month, reporting period) (3) value type variance with relative time variance.

Figure 11:
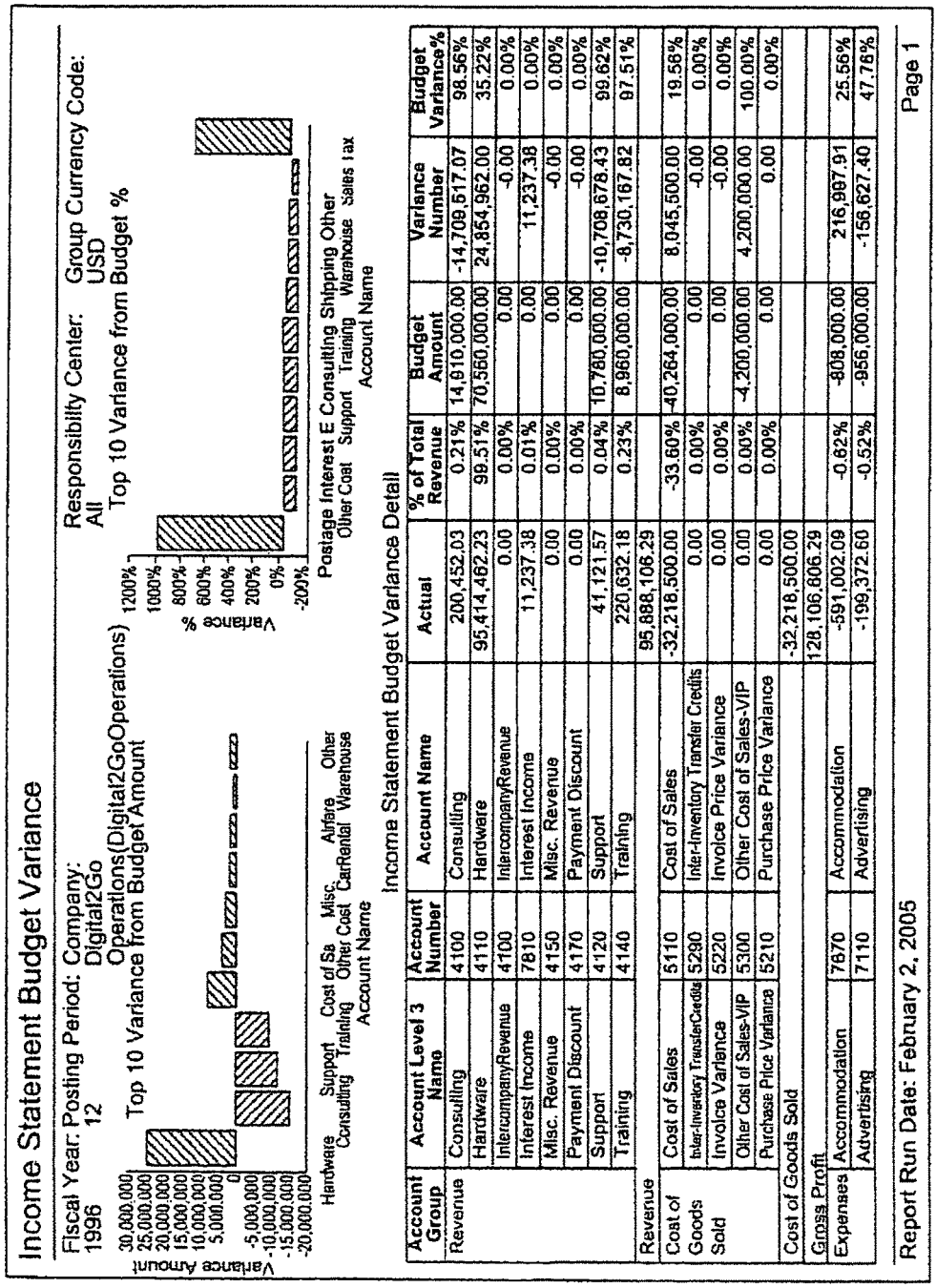
FIG. 11 is a diagram showing another example of an analytic type.

FIG. 11 shows an example report showing income statement budget variance.

The contribution analytic type 160 provides insight into the key contributors to a measure of interest (e.g. revenue, profit, and turnover). The contribution analytic type 160 examines the major contributors to a business area using one or more measures, and ranks them so as to provide largest to smallest contribution (e.g. rank the largest to smallest contributions to revenue by product), as well as the cumulative contribution (e.g. the top five contributors make up 65% of total revenue to the business).

The contribution analytic type 160 is further supplemented by an analysis of drivers of the level of contribution or related impacts of the contribution. This is achieved through the use of a scatter plot that maps the entity of interest (e.g. product, customer, and employee) against two resulted measures (e.g., product against revenue and profit). This helps to identify clustering behavior and identification of anomalies to support management decision-making. The measures and context to be combined in this analysis are chosen in the contribution analytic type template.

Figure 12:
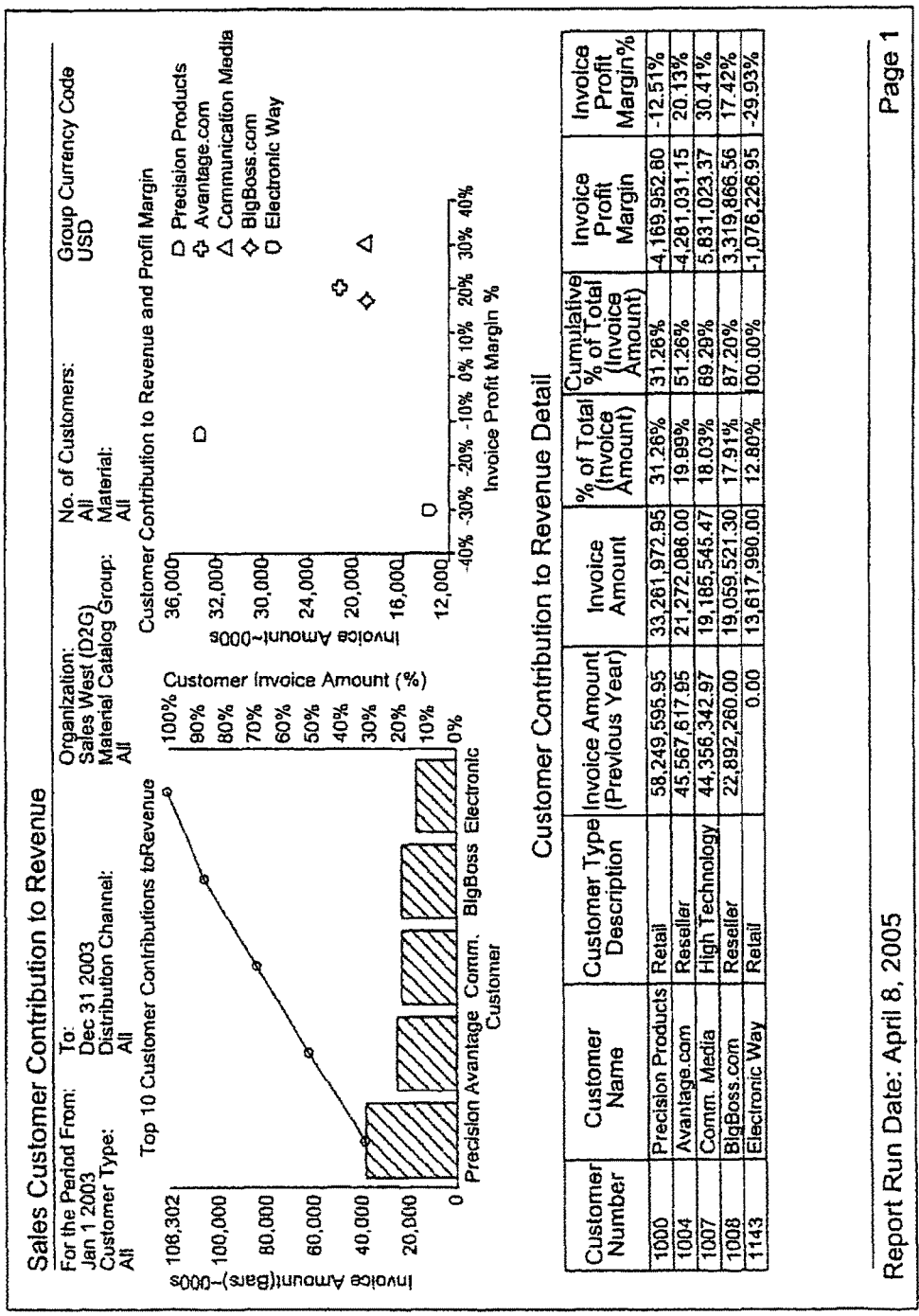
FIG. 12 is a diagram showing another example of an analytic type.
Figure 13:
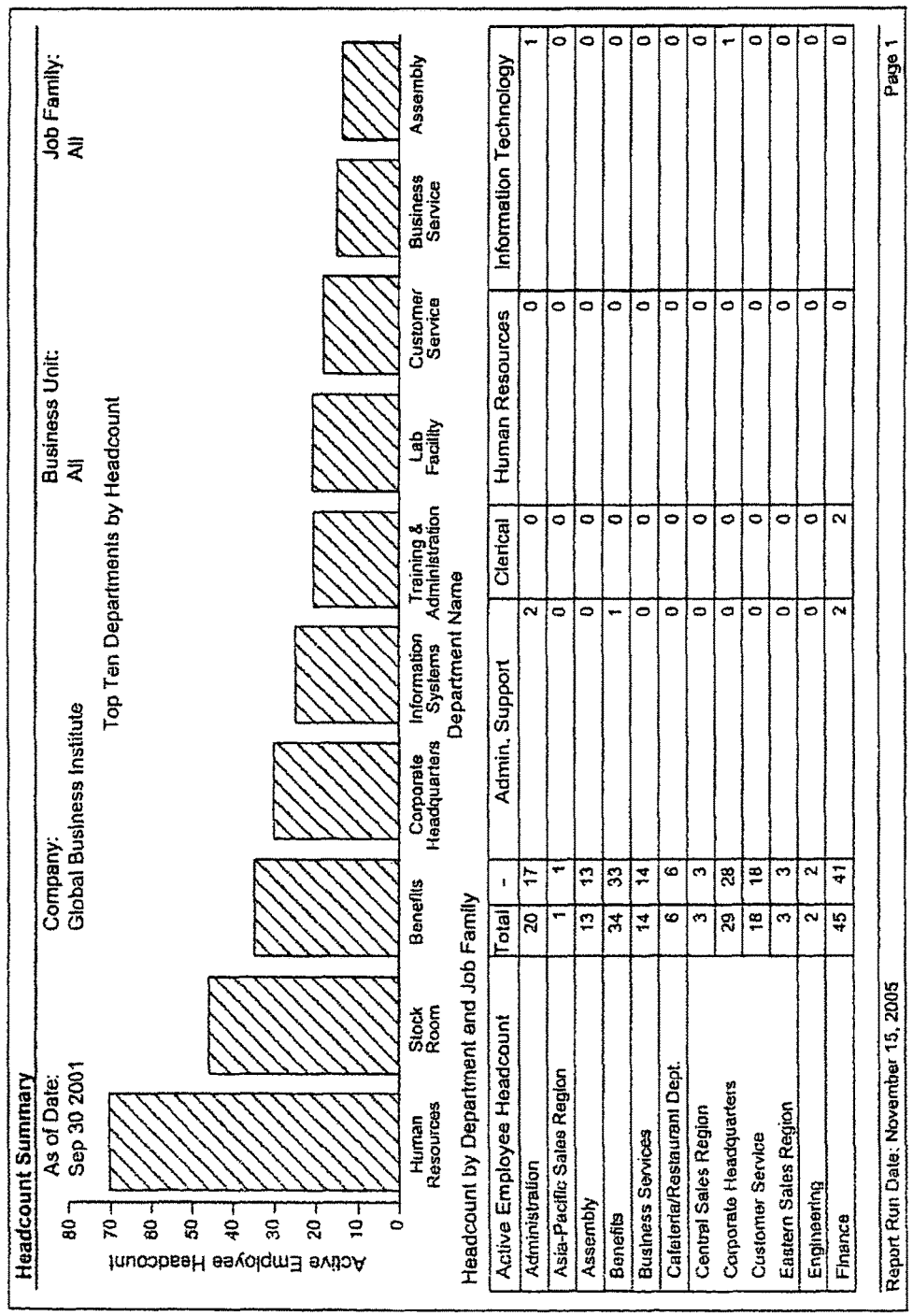
FIG. 13 is a diagram showing another example of an analytic type.

FIG. 12 shows an example of a report generated by the contribution analytic type 160. It is used to analyze how members of a group (e.g., products, vendors, customers, sales people, business units), are contributing to an observed phenomena (e.g., revenue, expenses, units sold) over a period of time. The example shown in FIG. 12 uses the template of the contribution analytic type 160 to create a specific analysis: "Sales Customer Contribution to Revenue". This is focused on examining the contribution of customers (ranked in descending order—Pareto Analysis) to revenue over a period of time. The customers are also plotted against two measures (revenue and probability—in a 2×2 grid) and details of the analysis are provided in the supporting table.

Figure 14:
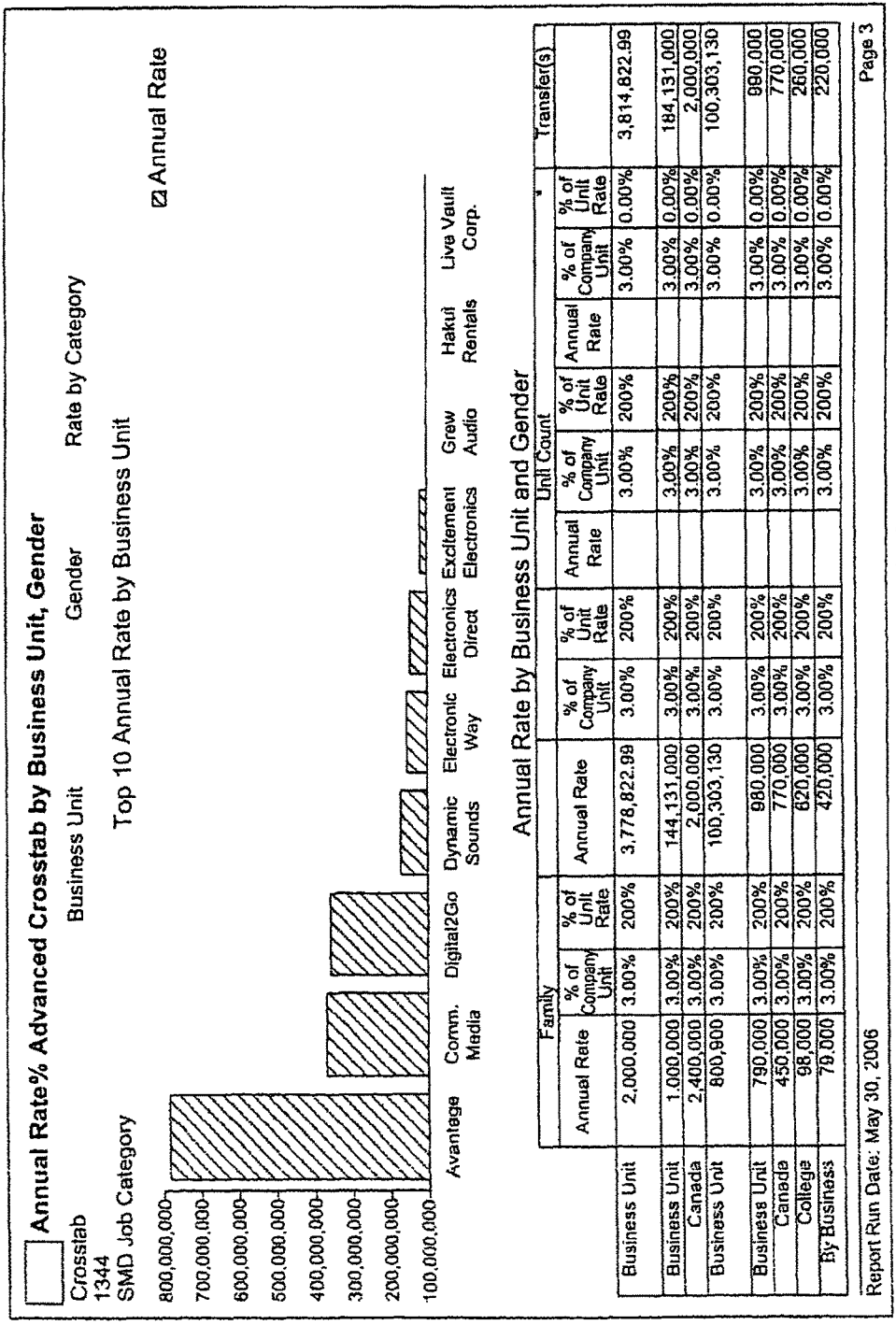
FIG. 14 is a diagram showing another example of an analytic type.

The cross-tab analytic type 161 supports the creation of analysis that is focused on assessing measures of interest (e.g. turnover) at the intersection of two dimensions/hierarchies of interest (e.g. employee type and organization). The report generated by the cross-tab analytic type 161 summarizes data and presents the summaries in a compact row and column format, as exemplified in FIG. 13. FIG. 14 shows an example of an advanced cross-tab report.

The trend analytic type 171 provides insight into analyses focused on change over time of one or more measures. The foundation of the trend analytic type 171 is the cross-tab with time periods running across the top part of the cross-tab. The users are able to choose from multiple period columns options: Month, Quarter, or Year.

The general applications of the trend analytic type 171 include performing trending (e.g. turnover over time) on one measure against a primary dimension (e.g. by job type), and the second type handles multi-measure trending to allow for head-to-head measure analysis.

Figure 16:
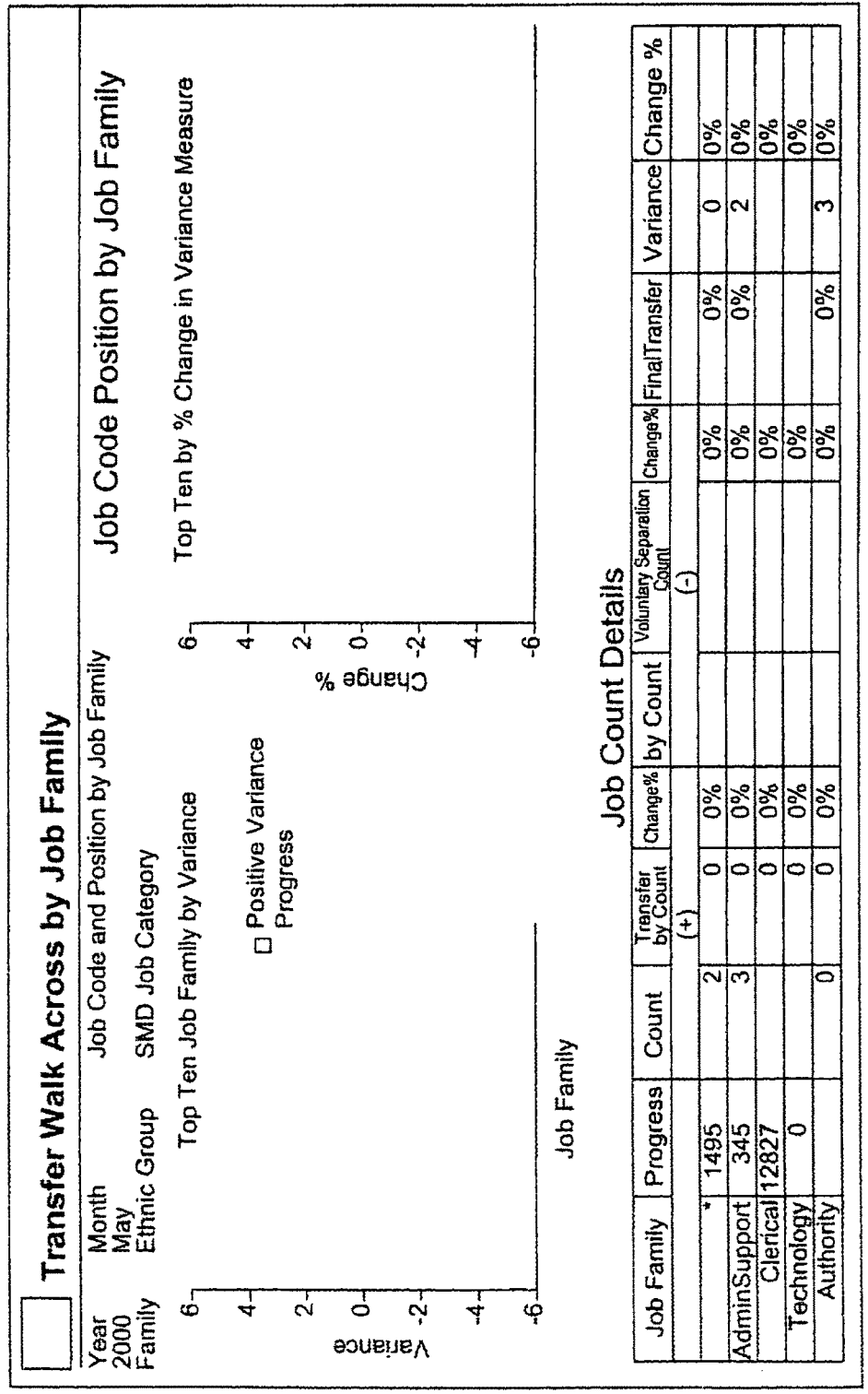
FIG. 16 is a diagram showing another example of an analytic type.
Figure 17:
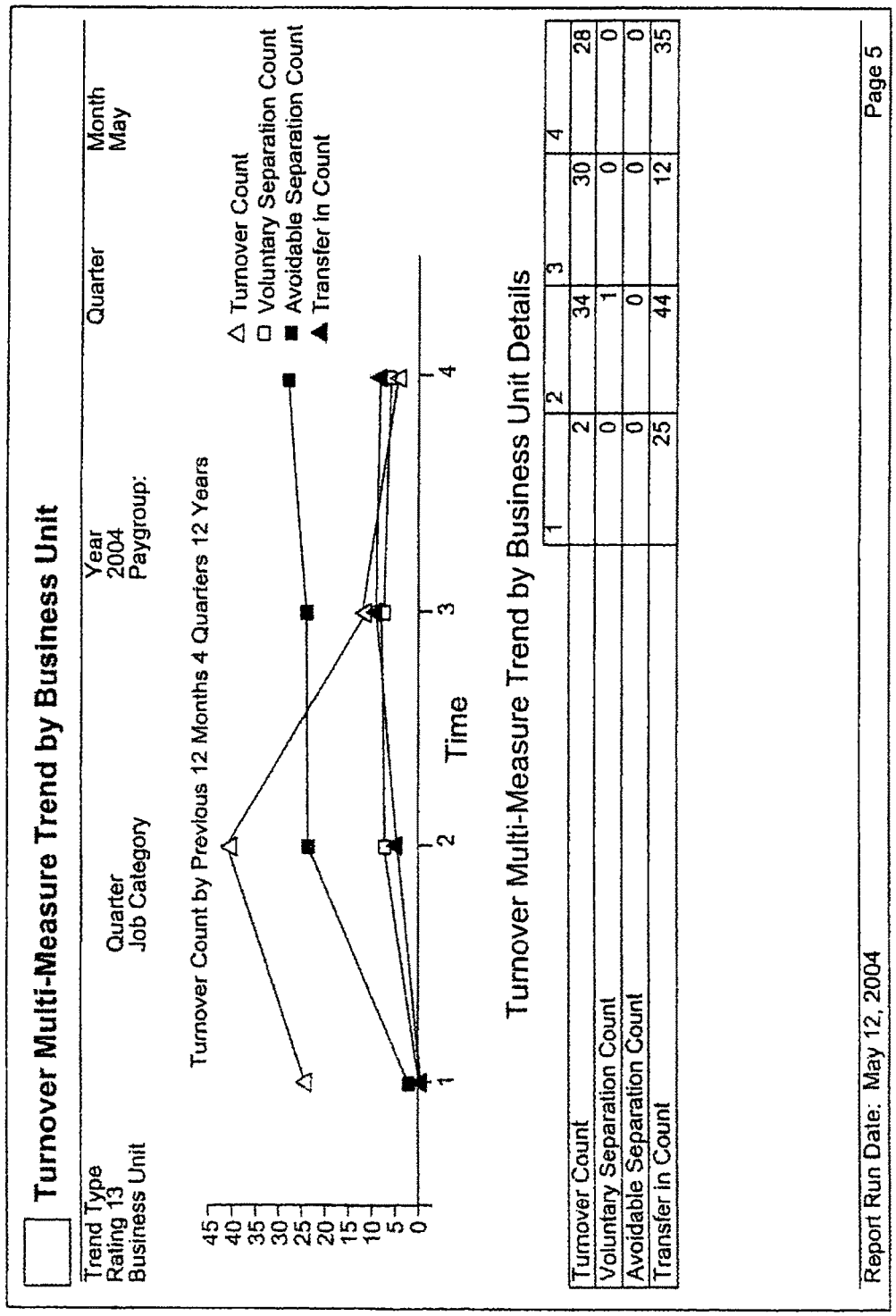
FIG. 17 is a diagram showing another example of an analytic type.

FIGS. 15-17 show examples of reports generated using the trend analytic type 171. FIG. 15 shows an example of a customer order purchase overview. FIG. 16 shows an example of a time period columns trend. FIG. 17 shows an example of a multi-measure trend.

Figure 18:
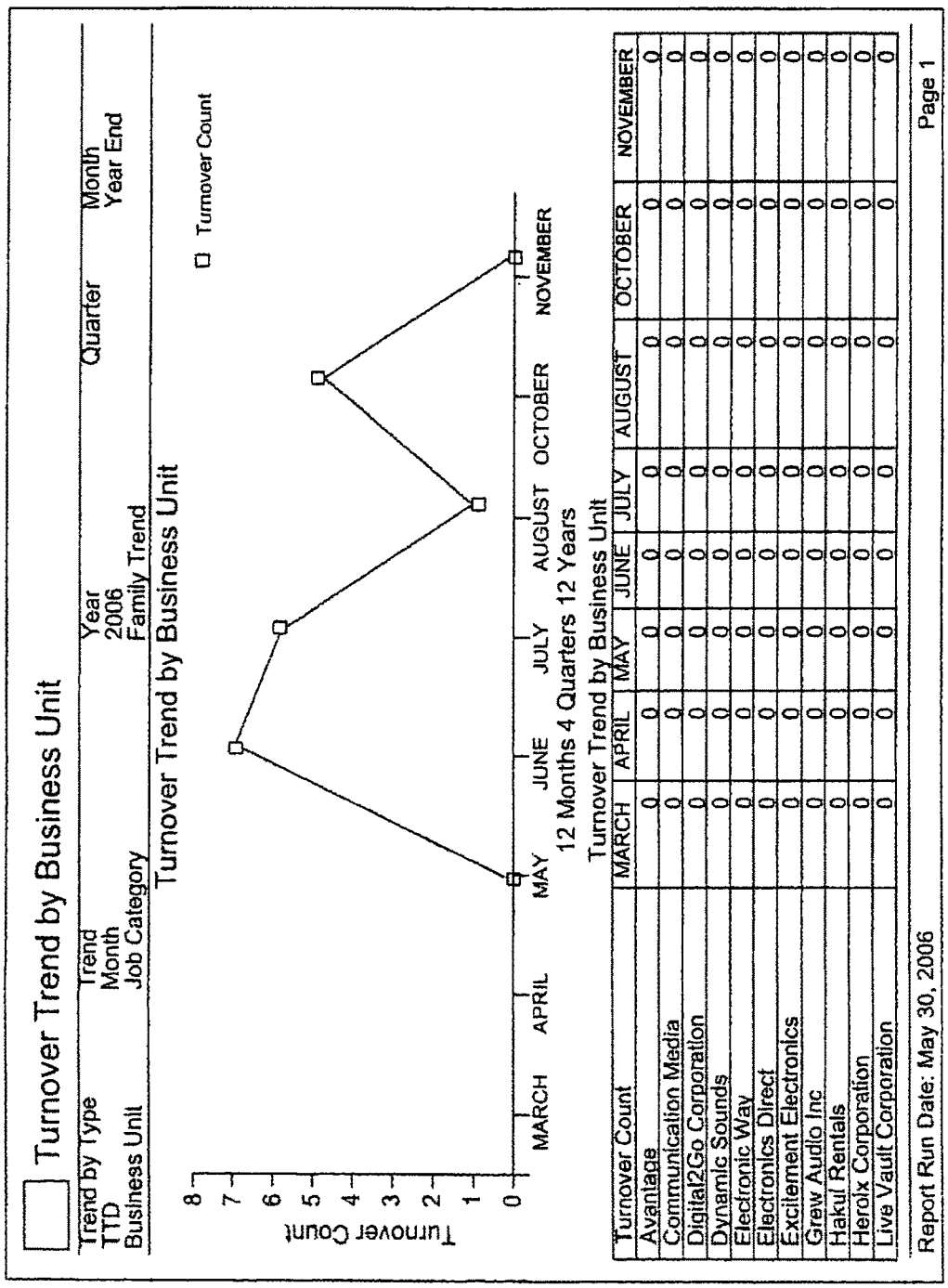
FIG. 18 is a diagram showing another example of an analytic type.

The analytic type framework 104 may also include a walkcross analytic type. This analytic type is used to analyze changes in headcount by type of resource for an organization, and the contributing factors to increases and decreases in headcount. FIG. 18 shows an example of a report generated by the walkcross analytic type.

In another embodiment, an analytic type framework may include financial analysis analytic types in addition to or as a combination with one or more of the analytic types shown in FIG. 3.

The financial analysis analytic types address the common analysis needs for financial related areas. Examples of the financial analytic types include balance sheet analytic types, income statement analytics types, and cashflow analytic types.

The balance sheet analytic types address common Balance Sheet analysis, and include support of vertical and horizontal financial analysis, time trending and point in time analysis, analysis at the level of the organization (both for a specific organization and across organizations). The analytics types within this group may also support the analysis of adjusted and unadjusted ledgers. The balance sheet analytic types may also support analysis of plan, forecast and actual comparisons.

A version of the balance sheet analytic types may also be delivered to support a financial management reporting (i.e. cost accounting) analysis.

The income statement analytics types address common Income Statement analysis, and include support of vertical and horizontal financial analysis, time trending and point in time analysis, analysis at the level of the organization (both for a specific organization and across organizations). The analytics types within this group may also support the analysis of adjusted and unadjusted ledgers.

A version of the income statement analytics types may also be delivered to support a financial management reporting (i.e. cost accounting) analysis.

The cashflow analytic types address common Cashflow analysis, and include support of vertical and horizontal financial analysis, time trending and point in time analysis, analysis at the level of the organization (both for a specific organization and across organizations). The analytics types within this group may also support the analysis of adjusted and unadjusted ledgers.

A version of the cashflow analytic type may also be delivered to support a financial management reporting (i.e. cost accounting) analysis.

Another group of analytic types are focused on operational analytics and process analytics. These include control (chart) analytic types, difference analytic types, and high low analytic types.

The control (chart) analytics types are used in control analysis, e.g., process improvement analysis. The control (chart) analytics types address different types of data (e.g., continuous and discrete) and at different levels of groups (e.g. individual and grouped data). The analytic type of this group may map actual observed values and averages against, control average, upper and lower control limits.

The analytic type of the control (chart) analytics types may allow for the setting of multiple control limits and deviation from control in absolute and relative amounts, as well as through inclusion of standard deviations.

The difference analytic types support the analysis of differences between data series (e.g. period over period financial analysis of account balances, or actual over planned/benchmark data). The differenceanalytic types may support analysis of actual differences and deviation differences. The analytic type(s) of this group may be represented though either line, bar or area charting and indicated directional performance (good/bad, high/low) through color coding.

High Low Analytic Type: This represents a series of types under this grouping that will address the following type of analysis.

The high low analytic types support analysis of groups of data, including the distribution between maximum and minimum values and the appropriate measure of central tendency (mean, median, mode). The high low analytic types also support analysis of differences between data series, e.g., period over period financial analysis of account balances, or actual over planned/benchmark data. The differences analysis supports analysis of actuals differences and deviation differences. The high low analytic type(s) may be represented though either line, bar or area charting and indicated directional performance (good/bad, high/low) though color coding. An example of the high low analytic types is analysis of selling price for a given product. The analysis compares the product across multiple markets or channels, and provides a plot and the detailed analysis of the highest, lowest selling prices and the mean.

The adaptive analytics system 100 allows that definition of individual analytic types evolves over time. It contains the comprehensive collection of analytic types templates 102. The analytic framework 104 provides the interrelationship mapping between types, which defines the analytic paths. By having these features, the adaptive analytics system 100 provides a consistent, best practice approach to analyzing problems of a particular type.

The adaptive analytics system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the adaptive analytics system 100 are described separately, however, two or more elements may be provided as a single element, or one or more elements may be shared with other components in one or more computer systems.

What is claimed is:

1. A computer-implemented method for an adaptive analytics application to create an analytic framework for use in analysing business intelligence (BI) information stored in a database system, the adaptive analytics application including an item handler module, an analytic path module, and a report module, the computer-implemented method comprising:

receiving, by the adaptive analytics application, a definition of a new role for analysing the BI information stored in the database system, wherein the definition of the new role specifies BI information requirements that are specific to the new role;

receiving, by the adaptive analytics application, selection of one or more analytic type templates for analysing the BI information, wherein each analytic type template specifies a layout of the BI information on a BI report to support a corresponding type of BI analysis, by specifying how dimensions of the BI information are assembled in the BI report and how measures of the BI information are included in the BI report;

configuring, by the item handler module, the selected one or more analytic type templates for the new role on the basis of the BI information requirements that are specific to the new role;

generating, by the analytic path module when executed by one or more computer processors, a new analytic framework based on the configured analytic type templates, wherein the new analytic framework defines at least one navigable analytic path between the configured analytic type templates, wherein the at least one navigable analytic path relates a summary-level view of the BI information to a detail-level view of the BI information;

navigating from the summary-level view to the detail-level view based on the at least one navigable analytic path defined by the new analytic framework; and generating, by the report module, the BI report by analysing the BI information based on the new analytic framework, whereafter the BI report is output.

2. The computer-implemented method as claimed in claim 1, wherein the configuring step comprises the step of:
specifying measures and dimensions relating to the new role on the basis of the BI information requirements that are specific to the new role.

3. The computer-implemented method as claimed in claim 1, further comprising:
generating BI reports containing BI information obtained from a source database system based on new BI reports created for the role; and
guiding navigation of the BI information using the at least one navigable analytic path among the new BI reports in the new analytic framework.

4. The computer-implemented method as claimed in claim 3, wherein the guiding step comprises the step of:
drilling BI information from the summary-level view to the detail-level view.

5. The computer-implemented method as claimed in claim 1, further comprising:
accepting modification of existing analysis types or addition of new analytic analysis types; and
incorporating the modified analysis types or new analytic analysis types in the analytic framework.

6. The computer-implemented method of claim 5, wherein the analytic framework is adaptable for modification of existing analysis types and addition of new analytic analysis types.

7. A non-transitory computer readable medium containing an adaptive analytics application executable to perform an operation to create an analytic framework for use in analysing business intelligence (BI) information stored in a database system, the adaptive analytics application including an item handler module, an analytic path module, and a report module, the operation comprising:

receiving, by the adaptive analytics application, a definition of a new role for analysing the BI information stored in the database system, wherein the definition of the new role specifies BI information requirements that are specific to the new role;

receiving, by the adaptive analytics application, selection of one or more analytic type templates for analysing the BI information, wherein each analytic type template specifies a layout of the BI information on a BI report to support a corresponding type of BI analysis, by specifying how dimensions of the BI information are assembled in the BI report and how measures of the BI information are included in the BI report;

configuring, by the item handler module, the selected one or more analytic type templates for the new role on the basis of the BI information requirements that are specific to the new role;

generating, by the analytic path module when executed by one or more computer processors, a new analytic framework based on the configured analytic type templates, wherein the new analytic framework defines at least one navigable analytic path between the configured analytic type templates, wherein the at least one navigable analytic path relates a summary-level view of the BI information to a detail-level view of the BI information;

navigating from the summary-level view to the detail-level view based on the at least one navigable analytic path defined by the new analytic framework; and generating, by the report module, the BI report by analysing the BI information, based on the new analytic framework, whereafter the BI report is output.

8. The non-transitory computer readable medium of claim 7, wherein the analytic framework is adaptable for modification of existing analysis types and addition of new analytic analysis types.

9. A computer-implemented method for an adaptive analytics application to create an analytic framework for use in analysing business intelligence (BI) information stored in a database system, the adaptive analytics application including an item handler module, an analytic path module, and a report module, the computer-implemented method comprising:

receiving, by the adaptive analytics application, a definition of a new role for analysing the BI information stored in the database system, wherein the definition of the new role specifies BI information requirements that are specific to the new role;

receiving, by the adaptive analytics application, selection of one or more analytic type templates for analysing the BI information, wherein each analytic type template specifies a layout of the BI information on a BI report to support a corresponding type of BI analysis, by specifying how dimensions of the BI information are assembled in the BI report and how measures of the BI information are included in the BI report;

configuring, by the item handler module, the selected one or more analytic type templates for the new role on the basis of the BI information requirements that are specific to the new role;

generating a new analytic framework based on the configured analytic type templates, wherein the new analytic framework defines at least one navigable analytic path between the configured analytic type templates, wherein the at least one navigable analytic path relates a summary-level view of the BI information to a detail-level view of the BI information, wherein generating the new analytic framework comprises:
generating, by the report module, a series of BI reports based on the configured analytic type templates for the new role;
generating, by the analytic path module when executed by one or more computer processors, the at least one navigable analytic path by linking the series of BI reports based on a predefined analytic framework describing relations between analytic types; and
forming the new analytic framework based on the series of BI reports and the at least one navigable analytic paths; and
navigating from the summary-level view to the detail-level view based on the at least one navigable analytic path linking the series of BI reports in the new analytic framework, wherein at least one of the series of BI reports is output.

10. The computer-implemented method of claim 9, wherein the analytic framework is adaptable for modification of existing analysis types and addition of new analytic analysis types, wherein each analytic type template provides a distinct layout that prescribes how primary, secondary, and tertiary dimensions are defined as assembled, how measures are included and considered, and how information is laid out to support a type of analysis of interest, wherein context is passed via the at least one navigable analytic path.

11. The computer-implemented method of claim 10, wherein the adaptive analytics application is configured to add and modify, based on user input, predefined content stored in a performance analysing system to which the adaptive analytics application is operatively connected, wherein the predefined content includes predefined metrics and predefined BI reports, wherein the predefined metrics include measurements based on which information in one or more database systems is analysed, wherein the predefined BI reports are used to generate BI reports to facilitate analysing business performance.

12. The computer-implemented method of claim 11, wherein the adaptive analytics application further includes a storage module configured to store the analytic type templates and the analytic framework, wherein the analytic path module is configured to generate analytic paths among the new BI reports, based on the analytic framework, wherein the generated new BI reports and analytic paths form a customized analytic framework and constitute a component of one or more analytic information systems for report generation and information navigation;
wherein the adaptive analytics application is configured such that the customized analytic framework is generated and evolves to adapt to changing information needs of one or more end-users over time without requiring any technical expertise of any BI report author other than the one or more end-users and in order to assist management decision-making processes by reducing time to obtain desired information by the one or more end-users.

13. The computer-implemented method of claim 12, wherein configuring the selected one or more analytic type templates for the new role comprises specifying measures and dimensions relating to the new role on the basis of the BI information requirements that are specific to the new role;
wherein the item handler module, the analytic path module, and the report module increase a measure by which the adaptive analytics application is adaptable to changing information needs over time, relative to predefined reports and custom reports in absence of the item handler module, the analytic path module, and the report module.

14. The computer-implemented method of claim 13, wherein the analytic framework accelerates reporting and analysis relative to reporting and analysis in an absence of the analytic framework, reduces a time cost of defining information needs for content development relative to absence of the analytic framework, improves a measure of consistency with which business information is represented relative to absence of the analytic framework, and increases adoption of BI information to support decision-making processes relative to absence of the analytic framework.

15. The computer-implemented method of claim 14, wherein the performance analysing system is configured to generate the one or more analytic information systems based on user input, wherein the one or more analytic information systems are operatively connected to the adaptive analytics application and the one or more database systems, wherein the one or more analytic information systems are configured to provide BI reports and drill paths therebetween in order to facilitate BI analysis of the information stored in the one or more database systems, wherein each analytic information system is specifically tailored for a particular business organization.

16. The computer-implemented method of claim 15, wherein the analytic type templates include templates representing operational analysis types and analytic analysis types, wherein the analytic type templates representing the operational analysis types include templates representing a transaction detail analytic type and transaction list analytic type, wherein the analytic type templates representing the analytic analysis types include templates representing a detailed summary analytic type, profile analytic type, cycle time aging analytic type, contribution analytic type, cross-tab analytic type, variance analytic type, trend analytic type, and walkcross analytic type.

17. The computer-implemented method of claim 16, wherein the variance analytic type is independently usable to provide each individual kind of analysis selected from budget variance at a business organization level, budget variance at a cost centre manager level, and actual to planned headcount variance, wherein most significant impacts in both relative terms and absolute terms within each kind of analysis is highlighted, wherein the variance analytic type is independently usable to support each individual variance type selected from: (i) value type variance only; (ii) relative time variance only; and (iii) value type variance with relative time variance;
wherein the trend analytic type is usable to provide trending of a desired measure against a primary dimension, wherein the trend analytic type is independently usable to provide each individual kind of analysis selected from sales revenue trend, customer turnover trend, customer turnover trend by job type, and bad debt trend.

18. The computer-implemented method of claim 17, wherein the contribution analytic type is independently usable to provide, for each individual entity selected from products, vendors, customers, employees, salespeople, and business units, each individual kind of analysis selected from revenue contribution, expense contribution, and unit sales contribution, wherein the contribution analytic type is independent supplemented by each analysis selected from drivers of a level of contribution and related impacts of the contribution and via a scatter plot mapping an entity of interest against two desired measures, in order to identify clustering behavior and anomalies.

19. The computer-implemented method of claim 18, wherein the profile analytic type is independently usable to provide each individual kind of analysis selected from: (i) employee analysis including pay and benefits to date, current position, recent performance ratings, and skills; (ii) customer analysis including contact information, sales representative, total sales to date, current receivables, past due balances, and product purchase activity summary; and (iii) activity analysis pertaining to a desired customer identified from the customer revenue contribution analysis.

20. The computer-implemented method of claim 19, wherein the cycle time aging analytic type is independently usable to provide each individual kind of analysis selected from accounts receivable aging schedule, employee turnover times, and production work order late delivery times, wherein the cross-tab analytic type is usable to analyse a measure of interest at the intersection of two desired dimensions;
   wherein the walkcross analytic type is independently usable to provide each individual kind of analysis selected from analysis of changes in headcount by type of resource for a specific organization, analysis of contributing factors to increases in headcount, and analysis of contributing factors to decreases in headcount.

21. The computer-implemented method of claim 20, wherein the analytic type templates representing the analytic analysis types further include templates representing financial analytic types and operational analytic types, respectively, wherein the financial analytic types include:
   (i) a balance sheet analytic type independently usable to support each individual kind of analysis selected from vertical financial analysis, horizontal financial analysis, time trending analysis, point-in-time analysis, cost accounting analysis, organization-level analysis for a specific organization, and organization-level analysis across multiple organizations;
   (ii) an income statement analytic type independently usable to support each individual kind of analysis selected from vertical financial analysis, horizontal financial analysis, time trending analysis, point-in-time analysis, cost accounting analysis, adjusted and unadjusted ledger analysis, organization-level analysis for a specific organization, and organization-level analysis across multiple organizations; and
   (iii) a cashflow analytic type independently usable to support each individual kind of analysis selected from vertical financial analysis, horizontal financial analysis, cost accounting analysis, adjusted and unadjusted ledger analysis, organization-level analysis for a specific organization, organization-level analysis across multiple organizations, and analysis of adjusted and unadjusted ledgers.

22. The computer-implemented method of claim 21, wherein the operational analytic types include:
   (i) a control analytic type independently usable to support each individual data type data selected from continuous data and discrete data, at each individual grouping level selected from grouped data and ungrouped data, in order to map observed actual values against upper, lower, and average control limits;
   (ii) a difference analytic type usable to independently support each individual kind of analysis selected from actual differences between data series and deviation differences between data series; and
   (iii) a high-low analytic type usable to independently support each individual kind of analysis selected from distribution between maximum and minimum values and a desired measure of central tendency, financial analysis of account balances by period, actual to planned benchmark data, actual difference analysis, deviation difference analysis, product selling price by market, product selling price by sales channel.

* * * * *